United States Patent [19]

Fruman

[11] 4,022,694
[45] May 10, 1977

[54] OIL-WATER SEPARATION APPARATUS
[75] Inventor: Daniel H. Fruman, Le Pecq, France
[73] Assignee: Hydronautics, Incorporated, Laurel, Md.
[22] Filed: Dec. 3, 1975
[21] Appl. No.: 637,131

Related U.S. Application Data

[63] Continuation-in-part of Ser. No. 467,466, May 6, 1974, abandoned.

[52] U.S. Cl. .............................................. 210/350
[51] Int. Cl.² ...................................... B01D 29/38
[58] Field of Search .............. 210/23 R, 30 A, 40, 210/350, 351, 352, DIG. 26, 413, 414

[56] References Cited

UNITED STATES PATENTS

| | | | |
|---|---|---|---|
| 2,087,708 | 7/1937 | Trinkle | 210/350 |
| 3,131,040 | 4/1964 | Dunn et al. | 210/351 |
| 3,276,594 | 10/1966 | Gwilliam | 210/350 |
| 3,617,551 | 11/1971 | Johnston | 210/23 R |

Primary Examiner—Frank A. Spear, Jr.
Assistant Examiner—Ivars Cintins
Attorney, Agent, or Firm—Finnegan, Henderson, Farabow & Garrett

[57] ABSTRACT

Oil-water separation apparatus having a flow-through chamber containing a block of foam filter material regenerable by squeezing, a pair of perforated end plates located on either side of the foam block within the chamber at least one of which responds to applied pressure to squeeze the foam, and a flexible envelope of impervious material surrounding the foam block between the block and the inside walls of the chamber and connected at each end to the plates to avoid channeling and friction between the foam block and the walls of the chamber.

8 Claims, 3 Drawing Figures

OIL-WATER SEPARATION APPARATUS

This application is a continuation-in-part of application Ser. No. 467,466, filed May 6, 1974, now abandoned.

This invention relates to oil-water separation apparatus. More particularly, this invention relates to an improved, cartridge-type filtering apparatus containing a block of squeezable foam that is encased in an envelope of flexible impervious material to avoid channeling and provide a more efficient and effective oil-water separation process.

In U.S. Pat. No. 3,617,551 to Johnston, there is generally disclosed oil-water separation apparatus having a flowthrough chamber containing a block of regenerable, porous filter material, such as polyurethane foam. The block of material is located between a pair of spaced, perforated plates and at least one of the plates is movable in response to an applied pressure to periodically squeeze absorbed oil from the filter material and regenerate it for further use.

To minimize the tendency to channel or short-circuit the feed water along the walls of the chamber, the foam block is oversized with respect to the chamber to produce precompression of the foam against the inside walls of the chamber. It has been found, however, as more fully described below, that even with considerable precompression of the foam, there is still channeling because after the foam becomes blocked by the separated contaminate in the feed, the space along the wall of the chamber naturally offers a path of lesser resistance.

Moreover, the oversizing of the foam necessarily creates friction between the foam and the stationary walls of the chamber during regeneration, preventing it from recovering its initial shape following regeneration. Not only does this incomplete recovery result in a deterioration of its filtration characteristics, but the friction eventually affects its integrity after repeated squeezings.

Channeling, therefore, has not only been impossible to prevent, but minimization of its effects has been severely limited by the elastic capacity of the foam to overcome the friction generated by its lateral precompression.

Accordingly, it is an object of the present invention to provide a cartridge-type filtering apparatus that successfully avoids channeling in the flow of feed water through the apparatus but that permits the foam block to readily compress and expand within the chamber during regeneration without interfering with the side walls of the chamber.

In accordance with the present invention, such objectives are achieved in oil-water separation apparatus having a flow-through separation chamber containing a block of porous material regenerable by compression and a pair of perforated plates located on either side of the block, at least one of which responds to applied pressure to compress the material, by providing an envelope of flexible, impervious material completely surrounding the outer surface of the foam block between the block and the inside walls of the chamber. The envelope is connected at either end to the plates and preferably in a releasable manner so that the foam material and envelope can be readily replaced when necessary.

It is to be understood that both the foregoing general description and the following detailed description are exemplary and explanatory but are not restrictive of the invention.

The accompanying drawings constitute a part of the specification and illustrate a preferred embodiment of the invention and together with the description serve to explain the principles of the invention.

Figure 1:
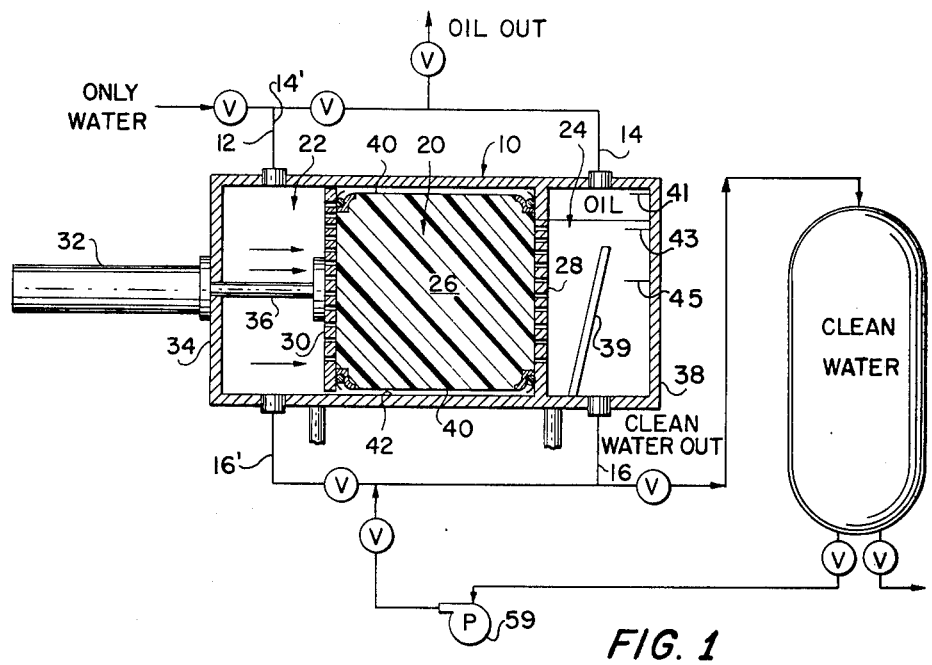
FIG. 1 is a schematic, cross-sectional view of a cartridge-type oil-water separation apparatus embodying the improvement of the present invention.

With reference to FIG. 1, the oil-water separation apparatus includes a housing 10 having an oil-contaminated water inlet 12 and outlets 14 and 16 for the separated oil and water, respectively. Housing 10 is divided into three interconnected chambers, preferably arranged horizontally as shown in the drawings. These chambers consist of a separation chamber 20 essentially in the middle of the housing, a feed chamber 22 communicating with the influent side of separation chamber 20 for distributing the flow of feed uniformly through that chamber, and a floatation chamber 24 on the effluent side of the separation chamber for receiving the effluent from the separation chamber and permitting gravity separation of the effluent.

Separation chamber 20 is filled with a cartridge or block of porous material 26, having filtering characteristics with respect to the contaminated feed and, more particularly, oil-absorbing and oil-coalescing characteristics, that is regenerable by compression to remove absorbed contaminant from the material. Block 26 is held in position in housing 10 between two perforated plates 28 and 30; the rear perforated plate 28 being fixed in the housing and the front plate 30 being mounted for axial movement in response to applied pressure with respect to fixed plate 28. As shown, the means for applying pressure to plate 30 to compress porous block 26 and regenerate it for further use comprises a hydraulic cylinder 32 mounted on the front wall 34 of housing 10 and having a piston 36 that extends through feed chamber 22 and is connected to movable perforated plate 30. Thus, it can be seen that, as hydraulic cylinder 32 is actuated, perforated plate 30 pushes towards fixed rear plate 28 compressing material block 26 and expelling absorbed contaminant out of the block and into chambers 22 and 24.

Alternatively, if it is desired to express the absorbed contaminant during compression in only one direction, for example, only into floatation chamber 24, suitable one-way valves would be incorporated in plate 30 that would be open during the flow of feed through the system, but that would close during compression and regeneration.

Feed chamber 22 of housing 10 is defined by the space between the inside of front wall 34 and the front face of perforated plate 30 in its retracted position. While the provision of a feed chamber is not essential, it is desirable to permit the feed to be uniformly distributed over perforated plate 30 for uniform flow through porous block 26.

In accordance with the present invention, a flexible envelope 40 of impervious material completely surrounds the outer surface of foam block 26 and is located between the block and the inner wall surface 42 of separation chamber 20. Envelope 40 is of less diameter than wall surface 42 and is connected at either end to perforated plates 28 and 30, thus essentially providing a cartridge of filter material between the end plates that is separated from the inner walls of the housing by an annular space 50.

The selection of the material comprising porous block 26 is not critical provided the material has an open, reticulated structure and when used as an oil-water separator desirably have both oil-absorbing and oil-coalescing properties. A material found to be ideally suited for such use is a block of polyurethane foam having a pore size of between 30 and 100 pores per linear inch (ppi) and preferably a pore size of around 60 ppi. As more fully described below in connection with the operation of the system, it has been found that such polyurethane foams demonstrate excellent oil-scavenging properties with good flow characteristics over a large range of oil properties and concentrations.

Material 25 may consist of a plurality of discrete chips or a plurality of segmented pads lined up in series within the envelope, but preferably is a single, integral block of the porous foam. The block, in general, is found to be more efficient than filling up the envelope with a plurality of small chips of a compressible material.

Envelope 40 is preferably a sheet of impervious fabric having a rubberized coating, such as a hypalon coated sheet of a polyester fabric or nylon.

Figure 2:
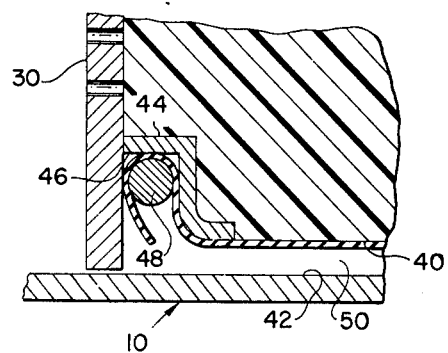
FIG. 2 is an exploded, fragmentary view showing a means for clamping the flexible envelope to the perforated plates.

In accordance with the invention, clamping means are provided for releasably clamping the ends of the envelope to the plates so that the envelope and foam block can be removed and replaced when necessary. As embodied and as best shown in FIG. 2, this means comprises an annular bracket 44 located on the inner surfaces of each plate that forms a channel 46 opening outwardly with respect to separation chamber 20. The ends of envelope 40 are draped into channels 46 and then clamped in place by a cable 48. The ends of cables 48 can be simply crimped together and then cut apart when it is necessary to replace the envelope or preferably they can be provided with a quick releasable clamp so they can be reused following replacement of the envelope. In any event, the clamping means should be tight enough to provide a sealed connection between the envelope and the plate and in particular between the envelope and the downstream plate.

Preferably, housing 10 and foam block 26 are circular and the block is oversized with respect to envelope 40 to precompress the foam against the envelope and avoid channeling between the envelope and the foam and the envelope is of less diameter than the inside wall of the chamber to prevent the envelope from contacting with the walls of the separation chamber.

Preferably, floatation chamber 24 is contiguous with separation chamber 20, forming an integral part of housing 10 and defined by the section between fixed rear perforated plate 28 and the rear wall of the housing. This provides a more compact and efficient separator, but it will readily be apparent to those skilled in the art that chamber 24 could be remote from the housing with suitable piping to transfer the effluent to the chamber.

Chamber 24 is preferably divided into two parts, as more clearly shown in FIG. 1, by a baffle 39 to avoid contamination of the clean water outlet 16 and to increase gravity separation by creating an upward flow of the effluent in the chamber. When the oil is a light oil, the coalesced droplets accumulate at the top of chamber 24 and the upward flow of effluent along the baffle 39 assists in purging the droplets in this direction and out through oil outlet 14.

To control the level of accumulated oil in chamber 24, a plurality of oil-water interface detectors 41, 43, and 45 schematically illustrated in FIG. 1 are provided in rear wall 38 of housing 10. These detectors are conventional and operate on the differences in electrical conductivity of water and oil. Thus, for example, when the oil level in chamber 24 falls below middle detector 43, thus changing the conductivity between detectors 43 and 45, an oil pump (not shown) would be activated to pull the oil out of outlet 14 and thereby prevent the oil from falling to a level where it could contaminate the clean water outlet. Oil withdrawal is continued until the oil-water interface reaches detector 41 and then the pump is de-activated. This, of course, would be the arrangement for light oil-contaminated water, suitable modifications being made when heavy oil-contaminated water was being passed through the system.

In operation and with reference to FIG. 1, the contaminated feed is fed through inlet 12 into feed chamber 22 of separator 10 where it is evenly distributed throughout the cross-sectional dimensions of the housing. The porous regenerable material 26 meeting the above-defined criterion is typically a piece of polyurethane foam substantially filling up the space in separation chamber 20 bounded by envelope 40 and plates 28 and 30 and having 60 pores per linear inch, a thickness of approximately 16 inches, and a cross-sectional area of approximately 4 square feet. The contaminated feed flows through foam block 26 where the oil is absorbed and/or coalesced depending upon the degree of saturation of the foam.

In the beginning, practically all of the oil is absorbed by the foam, but after the foam begins to become saturated, large droplets of coalesced oil start to appear in the effluent as a result of the oily water passing through the foam. Discharging this effluent in chamber 24, however, permits the large coalesced droplets of the oil to be readily separated by gravity, so that it is not necessary to shut off the feed at this point and regenerate the foam just because oil appears in the effluent. The separated droplets are then withdrawn through oil outlet 14 and the heavier, clean water through outlet 16.

The separation step cannot be sustained indefinitely. At a certain level of oil saturation of foam pad 26, the pressure drop across the foam increases to such an extent that it tends to block the flow of contaminated water. The flow of water is then stopped and regeneration of foam block 26 is accomplished by moving perforated plate 30 toward fixed plate 28 by hydraulic cylinder 32 to compress the foam and expel the absorbed oil. The oil expelled from the foam flows into both feed chamber 22 and floatation chamber 24 where it rises to the top of the chambers and is drawn off through oil outlets 14 and 14'.

To assist in purging the expelled oil, clean water can be pumped back into chambers 22 and 24 during regeneration by pump 59, as shown in FIG. 1, to push accumulated oil towards oil outlets 14 and 14'. Following regeneration, hydraulic cylinder 32 is retracted, water inlet 16' and oil outlet 14' to feed chamber 22 are closed, and the oily water is again fed to the separator.

By permitting gravity floatation of the effluent from the polyurethane foam, both the absorbing and coalescing properties of the foam can be utilized resulting primarily in longer periods of operation between regeneration without sacrificing the quality of the effluent or the flow rate through the separator.

During operation, the feed will slip past plate 30 and form a stagnant pool of feed water around the envelope in the annular space 50 between the envelope and the chamber of equal or greater pressure than that of the flow of fluid through the foam block. While this feed is still contaminated, it can be seen that it cannot short-circuit the block and pass unfiltered to chamber 24 because the downstream end of the envelope is sealably clamped to fixed plate 28. The presence of this pressurized pool of feed water not only keeps the envelope out of contact with the walls of the housing but more importantly, tends to compress envelop 40 against foam block 26, thus avoiding collapse of the foam and substantially preventing channeling, as heretofore encountered in prior art devices, between the foam block and its surrounding environment.

For example, in the above-described oil-water separation apparatus, it was found that with the foam block compressed inside a flexible and impervious envelope or sleeve, that a pressure differential of 17 psi was achieved during a typical oil-water separation operation between the inlet and outlet end of the unit. On the other hand, when a similar apparatus was used in which the foam was similarly compressed directly against the side walls of a separation chamber, as in the above-mentioned Johnston patent, and without any sleeve or envelope between the foam and the chamber, that the pressure differential was limited to about 2 psi. This relative difference in the pressure differential, indicates that considerably more of the feed of oily water that had been fed to the inlet end of the device, was short circuiting by channeling down the side walls of the chamber, escaping filtration and resulting in a prematurely contaminated effluent.

Oily water, for which the present apparatus is designed to separate, tends to visibly obscure this channeling effect. Accordingly, additional tests were conducted using a transparent separation chamber and a fluid feed that simulated a typical oily water, but that allowed one to visually observe the relative amount of channeling that occurred with and without an impervious envelope around the foam as in the present invention.

To conduct these tests, a circular test cell having an inside diameter of 6.5 inches was constructed of transparent acrylic plastic with a fixed perforated plate mounted at the outlet end and a movable perforated plate at the inlet end connected to a hydraulic cylinder for moving the plate and squeezing the foam against the fixed plate in accordance with the present invention.

A foam block (Block A) was then cut from a 100 ppi polyurethane foam. Block A was 9 inches long and 8.6 inches in diameter. Block A was inserted into the 6.5 inch diameter chamber between the plates and was thus compressed by a factor of 1.3. In this manner, the block was essentially sealed against the inside cell walls.

In a further example, another Block B was cut from the same block of 100 ppi polyurethane foam. Block B was also 9 inches long, but had a diameter of 6.5 inches. The outer surface of Block B was bonded to a cylindrical fabric impervious cover with silicone rubber that was 5 inches in diameter. Thus, Block B was also compressed by a factor of 1.3 into the 5 inch diameter envelope.

A flow rate was then established through the cell at 1.4 gallons per minute and to simulate a typical oily water with respect to particulate material, a mixture of paper fiber and water was injected into the flow to clog the foam. Pressure drop across the foam block from the inlet end to the outlet end was measured during each test.

With Block A it was found that the pressure differential between the inlet end and the outlet end of the cell foam quickly stabilized at 0.6 psi and this pressure differential maintained itself for 2½ hours. Channeling of the flow between the foam and the cell wall was visually observed through the transparent cell walls. Small fiber particles were seen to move along the inside wall of the test cell and contamination of the effluent by the paper fiber was obvious.

When Block A was removed, however, and replaced by enveloped, Block B in which the ends of the envelope were secured to the fixed and movable plates, the pressure differential rose rapidly to 21 psi when the fiber was introduced. The flow rate dropped to 0.1 gallons per minute, the maximum flow that the test cell could sustain against such a high pressure. The system was maintained at these conditions for 1 hour. No channeling was observed and the effluent was free of fibers during the test run The comparative tests thus show that the envelope foam block or cartridge does not suffer nearly the same effects of channeling that are inherent in cells where the foam blocks, such as that shown in the Johnston patent, are merely compressed against the inside walls of the separation chamber.

Figure 3:
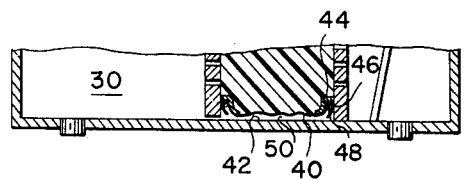
FIG. 3 is a fragmentary view similar to FIG. 1, but showing the foam block during regeneration.

During regeneration, as discussed above and as shown in FIG. 3, the flexible envelope folds up with the foam and thus also provides the advantage of keeping the foam out of contact with the walls of the chamber, thereby avoiding friction during compression and consequent wear on the surface of the foam and permitting expansion of the foam block to its initial shape following regeneration for more effective filtration.

In addition, and to prevent sliding of the foam with respect to the envelope during compression and expansion, the flexible envelope can be glued to the outer surface of the foam block with a suitable polyurethane compatible glue, such as silicone rubber, without departing from the scope of the present invention.

The invention thus provides an improved foam block oil-water separator that more effectively avoids channeling while eliminating friction between the foam and the chamber walls during regeneration.

The invention in its broader aspects is not limited to the specific details shown and described and departures may be made from such details without departing from the principles of the invention and without sacrificing its chief advantages.

What is claimed is:

1. Oil-water separation apparatus comprising a housing having an inlet and an outlet end; said inlet end having an inlet for introducing an oil-water fluid into the housing, said outlet end having an outlet for removing separated oil from the housing and an outlet for removing separated water from the housing; a pair of perforated plates axially spaced within the housing intermediate its ends, one of which is fixed in the housing and the other is movably mounted within the housing, said plates forming between them and with the inner wall surface of the housing a flowthrough separation chamber; porous filter material that is regenerable by compression located within the chamber; an envelope of flexible, impervious material surrounding the outer surface of the porous material adjacent the inner wall surface of the separation chamber, said envelope having an outer dimension less than the dimension of the inner wall surface of the chamber and being conducted at one end to said movable plate and at the other end adjacent the fixed plate to form an annular space around the enveloped porous material between the envelope and the inner wall surface of the chamber that can be pressurized with fluid in opposition to the pressure of flow of fluid through the chamber, said porous filter material being oversized in an uncompressed state with respect to said dimension of the envelope so that it is compressed into the envelope; and means for moving under pressure the movable plate with respect to the fixed plate so that the porous filter material and its surrounding envelope can be axially compressed within the chamber.

2. Apparatus of claim 1, wherein said outer surface of the porous material is bonded to the envelope.

3. Apparatus of claim 1, wherein the perforated plate adjacent the outlet end is fixedly connected and sealed to the housing and the plate adjacent the inlet end is movably mounted within the housing and permits flow of fluid fed to the inlet to pass into the annular space to form a stagnant pool of fluid around the envelope having a pressure at least equal to that of the flow of fluid through the separation chamber, said envelope being sealably connected to the fixed plate to prevent the fluid in the annular space from reaching the outlet end and thereby bypassing the porous material in the separation chamber.

4. Apparatus of claim 1, wherein the porous filter material comprises a block of polyurethane foam.

5. Apparatus of claim 1, wherein the envelope is a rubber coated sheet of nylon.

6. Apparatus of claim 1, wherein the housing, chamber, and plates have a circular cross-section.

7. Apparatus of claim 1, including clamping means for connecting the ends of the envelope to the plates.

8. Apparatus of claim 7, wherein the clamping means comprises an annular bracket around the periphery of the perforated plates on the side adjacent the separation chamber and forming an annular and radially outwardly opening channel for receipt of the ends of the envelope; and a cable stretched around the channel to hold the ends of the envelope in place.

* * * * *